(12) United States Patent
Do

(10) Patent No.: US 9,924,079 B2
(45) Date of Patent: Mar. 20, 2018

(54) COMBINATION MIRROR AND CAMERA DEVICE

(71) Applicant: John Do, New York, NY (US)

(72) Inventor: John Do, New York, NY (US)

( * ) Notice: Subject to any disclaimer, the term of this patent is extended or adjusted under 35 U.S.C. 154(b) by 44 days.

(21) Appl. No.: 14/997,719

(22) Filed: Jan. 18, 2016

(65) Prior Publication Data
US 2016/0255250 A1   Sep. 1, 2016

Related U.S. Application Data

(60) Provisional application No. 62/121,082, filed on Feb. 26, 2015.

(51) Int. Cl.
*H04N 5/225* (2006.01)
*H04N 5/232* (2006.01)

(52) U.S. Cl.
CPC ......... *H04N 5/2252* (2013.01); *H04N 5/2251* (2013.01); *H04N 5/2253* (2013.01); *H04N 5/23293* (2013.01)

(58) Field of Classification Search
CPC .. H04N 5/2252; H04N 5/2251; H04N 5/2253; H04N 5/23293
See application file for complete search history.

(56) References Cited

U.S. PATENT DOCUMENTS

| | | | | |
|---|---|---|---|---|
| 6,095,334 A | * | 8/2000 | Belveal | A45D 42/04 |
| | | | | 132/316 |
| 6,830,154 B2 | * | 12/2004 | Zadro | A45D 33/008 |
| | | | | 132/316 |
| 7,171,114 B2 | | 1/2007 | Milton | |
| 7,713,058 B2 | | 5/2010 | Takahashi | |
| 2002/0196333 A1 | | 12/2002 | Gorischek | |
| 2003/0041871 A1 | * | 3/2003 | Endo | A45D 42/00 |
| | | | | 132/301 |
| 2011/0037842 A1 | | 2/2011 | Hinson et al. | |
| 2012/0160260 A1 | * | 6/2012 | Rolston | A45D 33/32 |
| | | | | 132/288 |

* cited by examiner

*Primary Examiner* — Tuan Ho
(74) *Attorney, Agent, or Firm* — Global Intellectual Property Agency, LLC; Daniel Enea

(57) ABSTRACT

A combination mirror and camera for viewing areas that are difficult to see, such as the rear of a user's head. The present invention includes a housing having a digital display on a first side thereof and a mirror on a second side thereof. The housing is disposed on a handle that can be conveniently grasped. A camera is connected to the housing and is adjustably positioned on an elongated, flexible, and adjustable cable. The flexible cable can retain its shape once disposed in a desired position. The housing further includes a recessed channel along the perimeter thereof that can receive the flexible cable and the camera in a stored position. The flexible cable and camera are removable from the recessed channel so as to position the camera in a desired location. The video captured by the camera is displayed on the digital display.

11 Claims, 4 Drawing Sheets

COMBINATION MIRROR AND CAMERA DEVICE

CROSS REFERENCE TO RELATED APPLICATION

This application claims the benefit of U.S. Provisional Application No. 62/121,082 filed on Feb. 26, 2015. The above identified patent application is herein incorporated by reference in its entirety to provide continuity of disclosure.

BACKGROUND OF THE INVENTION

The present invention relates to mirror devices. More specifically, the present invention provides a handheld mirror device having a display screen and camera connected thereto via a flexible cable.

People often need to see the back of their head in order to fix their hair or inspect the back side of their body for skin abnormalities or to see how various clothes fit thereon. However, it can be difficult to see the back of a user's head without using two or three mirrors while the user twists and turns their head to attempt to see the desired views of their hair, or other parts of the body, within the multiple mirrors. Thus, a device that allows a person to easily see the rear of the head or body and other hard to view areas is desired.

Devices have been disclosed in the prior art that relate to mirror devices. These include devices that have been patented and published in patent application publications. These devices generally relate to combination mirror and camera apparatuses or mirrors having integral displays, such as U.S. Patent Application Publication Number 2002/0196333, U.S. Patent Application Publication 2011/0037842, U.S. Pat. No. 7,171,114, and U.S. Pat. No. 7,713,058, These prior art devices have several known drawbacks. Some prior art discloses an apparatus having a mirror with a display built into the mirror and a handheld camera that transmits images to the display for viewing thereon. Other devices disclose a vanity mirror comprising a built-in display that is hidden until activated by a user and a video source capable of providing images to the built-in display for viewing thereon. However, the prior art fails to disclose a handheld device comprising a mirror, a display screen, and a camera that is connected thereto via a flexible cord that enables a user to conveniently dispose the cord in a desired position while holding the display in front of them, thereby allowing the device be portable. Further, the flexible cord is configured to retain the position in which it is disposed in order to provide a desired viewing angle for the user.

In light of the devices disclosed in the prior art, it is submitted that the present invention substantially diverges in design elements from the prior art and consequently it is clear that there is a need in the art for an improvement to existing mirror devices. In this regard the instant invention substantially fulfills these needs.

SUMMARY OF THE INVENTION

In view of the foregoing disadvantages inherent in the known types of combination mirror and camera devices now present in the prior art, the present invention provides a new combination mirror and camera device wherein the same can be utilized for providing convenience for the user when grooming one's hair or viewing the back side of a user's body.

It is therefore an object of the present invention to provide a new and improved combination mirror and camera device that has all of the advantages of the prior art and none of the disadvantages. The combination mirror and camera device comprises a housing having a digital display on a first side thereof and a mirror on a second side thereof. A camera is connected to the housing and is adjustably positioned on an elongated, flexible, adjustable cable. The housing further includes a recessed channel along the edges thereof that removably receives the flexible cable and the camera in a stored position. The flexible cable and camera are removable from the recessed channel so as to position the camera in a desired location. The camera is configured to produce video or still images, wherein the video or still images captured by the camera are displayed on the digital display. The housing is disposed on a handle that can be held by the user.

BRIEF DESCRIPTIONS OF THE DRAWINGS

Although the characteristic features of this invention will be particularly pointed out in the claims, the invention itself and manner in which it may be made and used may be better understood after a review of the following description, taken in connection with the accompanying drawings wherein like numeral annotations are provided throughout.

DETAILED DESCRIPTION OF THE INVENTION

Figure 1:
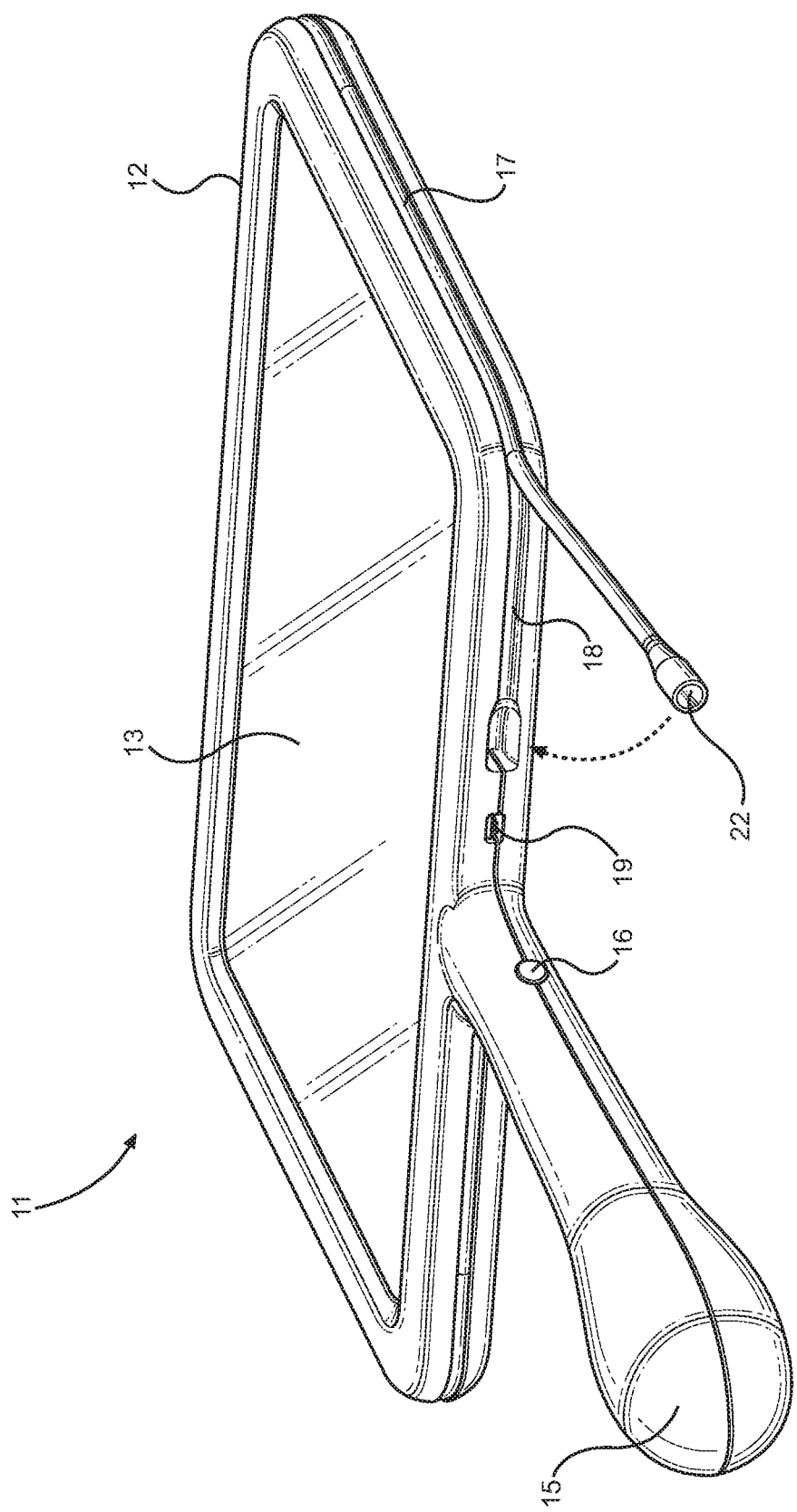
FIG. 1 shows a perspective view of the digital display of the first side of the housing of the present invention.

Reference is made herein to the attached drawings. Like reference numerals are used throughout the drawings to depict like or similar elements of the combination mirror and camera device. For the purposes of presenting a brief and clear description of the present invention, the preferred embodiment will be discussed as used for viewing areas that are difficult to see. The figures are intended for representative purposes only and should not be considered to be limiting in any respect.

Figure 2:
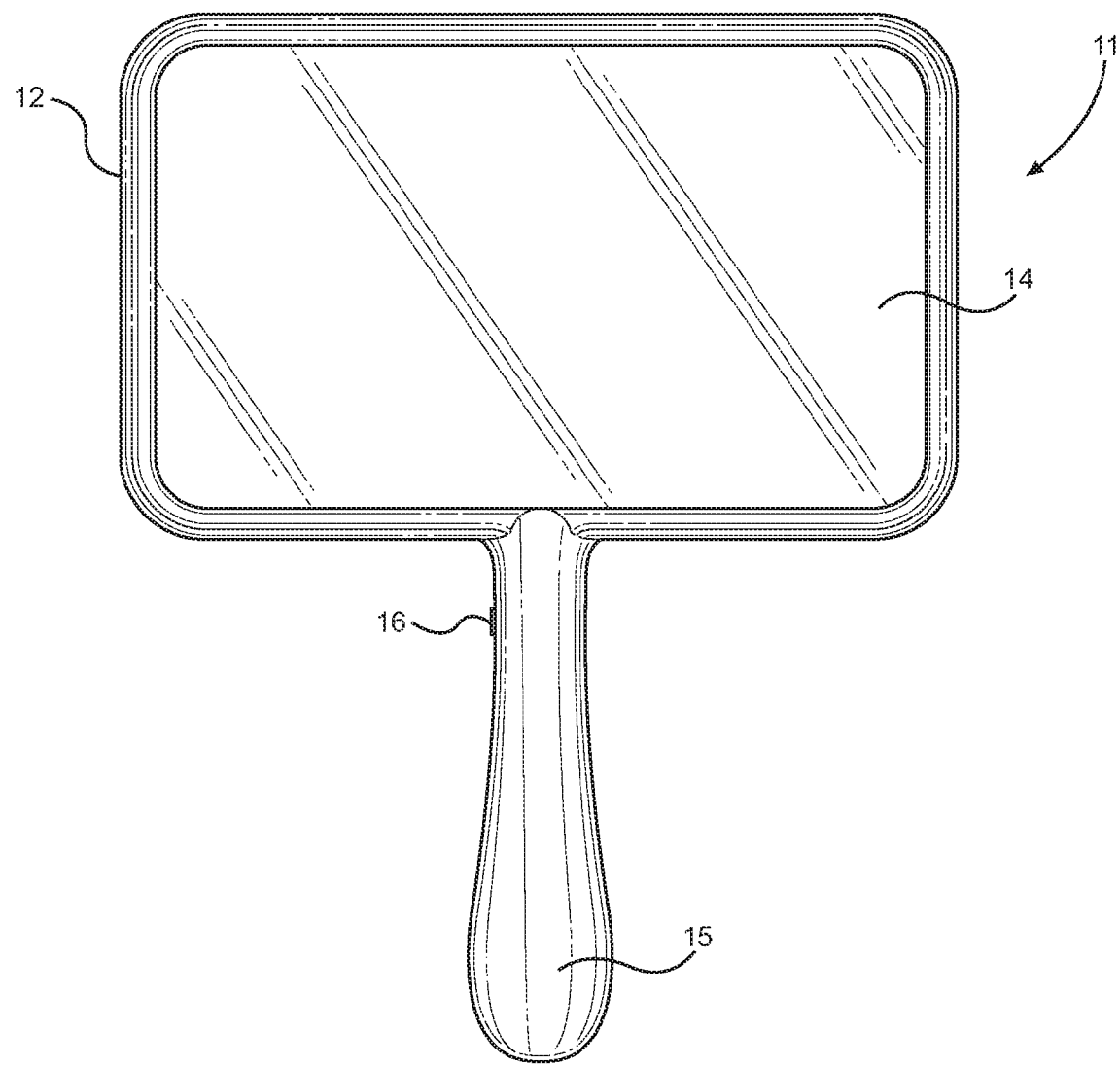
FIG. 2 shows a perspective view of the mirror of the second side of the housing of the present invention.

Referring now to FIGS. 1 and 2, there is shown a perspective view of the digital display of the first side of the housing and the mirror of the second side of the housing of present invention, respectively. The combination mirror and camera device 11 comprises a housing 12 having a digital display 13 on a first side thereof and a mirror 14 on a second side thereof, wherein the first side faces an opposing direction from the second side. Preferably, the housing is substantially planar and rectangular in shape, however, alternate embodiments comprise any suitable shaped, such as oval or square. A handle 15 extends from the lower end of the housing 12 so that the device 11 can be conveniently held by a user. In the illustrated embodiment, the handle 15 is integral to the housing 12. However, in alternate embodiments, the housing 12 comprises a kickstand or the like in order to allow the housing 12 to remain in an upright position and in a hands-free manner.

In the illustrated embodiment, the housing 12 resembles a frame that allows the digital display 13 and mirror 14 to remain back to back in a parallel position to one another. The digital display 13 and mirror 14 each comprise a shape that corresponds to the shape of the first side and second side of the housing 12, respectively. The digital display 13 and mirror 14 are secured to the housing 12 by any suitable fastener, such as adhesive. The mirror 14 is composed of any suitable reflective material, such as aluminum glass, and the digital display 13 is composed of any suitable viewing screen.

The device 11 further comprises a camera 22 that can be positioned in difficult to see areas, wherein the camera 22 is configured to take video or still images. The video captured by the camera 22 is displayed on the digital display 13. The camera 22 is connected to the housing 12 via an elongated, flexible cable 17. The flexible cable 17 is configured to allow the camera 22 to be adjustably positioned, such that flexible cable 17 can retain its shape when disposed in a desired position. The housing 12 further includes a switch 16 to turn the camera 22 and digital display 13 on and off and a port 19 so as to receive a charging cord in order to power the camera 22 and digital display 13. In some embodiments, the camera 22 comprises a light disposed thereon for providing illumination to the difficult to see areas, wherein such areas are poorly lit.

The camera 22 is movable between a stored configuration and a working configuration. The housing 12 further comprises a recessed channel 18 along the perimeter thereof that removably receives the flexible cable 17 and the camera 22 when in the stored configuration. In the illustrated embodiment, the recessed channel 18 In the stored configuration, the camera 22 and flexible cable 17 are prevented from becoming damaged or entangled with other objects.

However, in alternate embodiments, the flexible cable 17 and camera 22 can be stored in any suitable configuration and the housing 12 can be configured to receive such stored configuration. For example, in another embodiment, a retracting mechanism is disposed within the handle 15 and connected to an end of the flexible cable 17, wherein the retracting mechanism is adapted to retract the flexible cable 17 and camera 22 into the handle 15. In the working configuration, the flexible cable 17 and camera 22 are removed from the recessed area 18 so as to position the camera 22 in a desired location.

Figure 3:
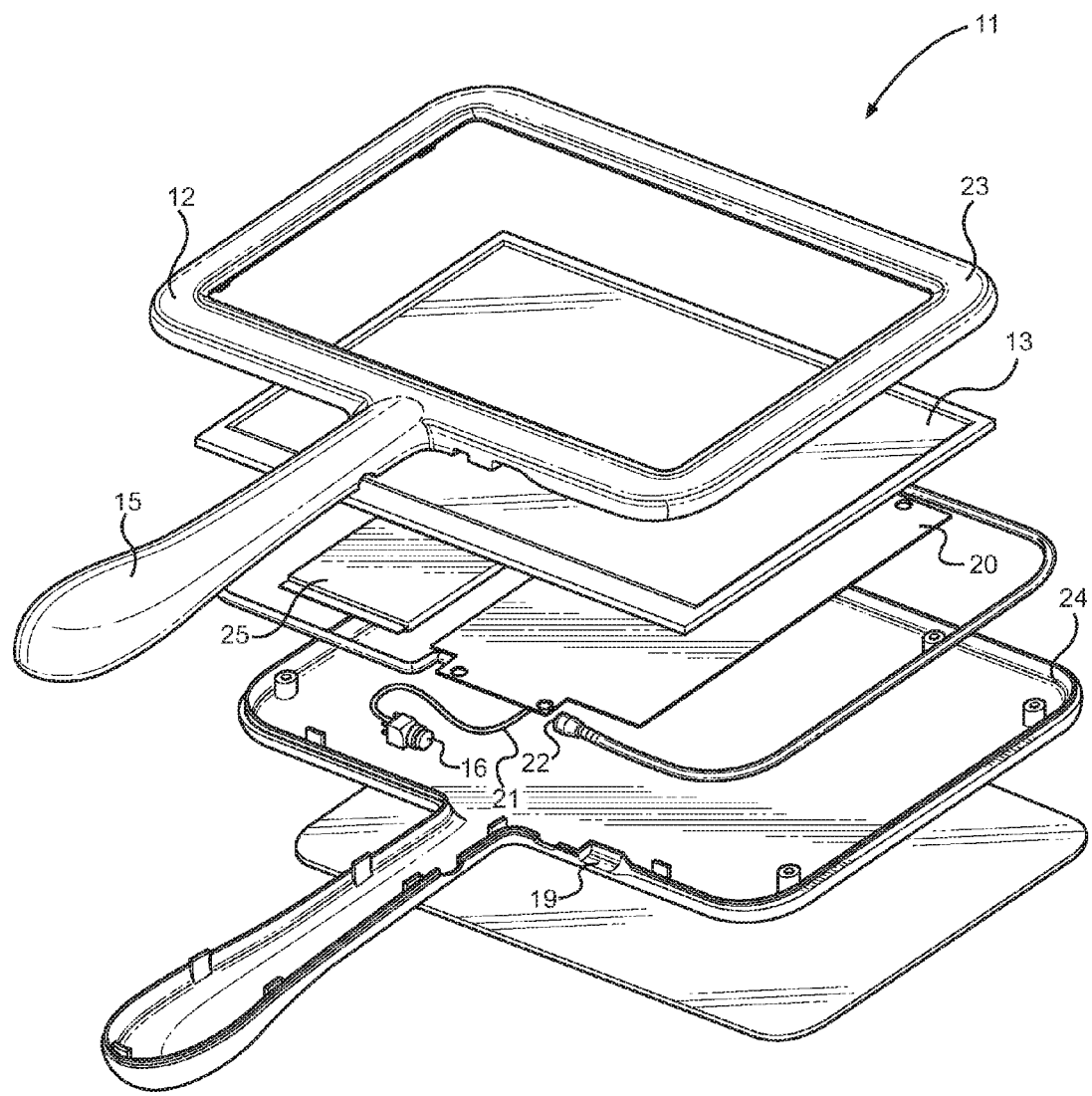
FIG. 3 shows an exploded view of the present invention.

Referring now to FIG. 3, there is shown an exploded view of the present invention. The housing 12 further stores the operating components of the camera 22 and digital display 13 between the upper and lower sections 23, 24 thereof. The combination mirror and camera device 11 comprises a control circuit 20 in which the camera 22 is operably connected to the digital display 13. Further, the switch 16 is operably connected to the camera and digital display 13 via the control circuit 20. In the illustrated embodiment, the switch 16 and camera 22 are electronically connected to the control circuit via wires 21, however, in alternate embodiments, any connection configuration is suitable. The port 19 is operably connected to the control circuit 20, wherein the port 19 receives a charging cord in order charge a power source 25 operably connected to the control circuit 20 such as a rechargeable battery. In other embodiments, the housing 12 or handle are configured to receive disposable batteries for powering the device 11. In some embodiments, the device 11 further comprises a memory configured to store video and still images captured by the camera 22, wherein the control circuit 20 is configured to recall and display the images on the digital display 13.

Figure 4:
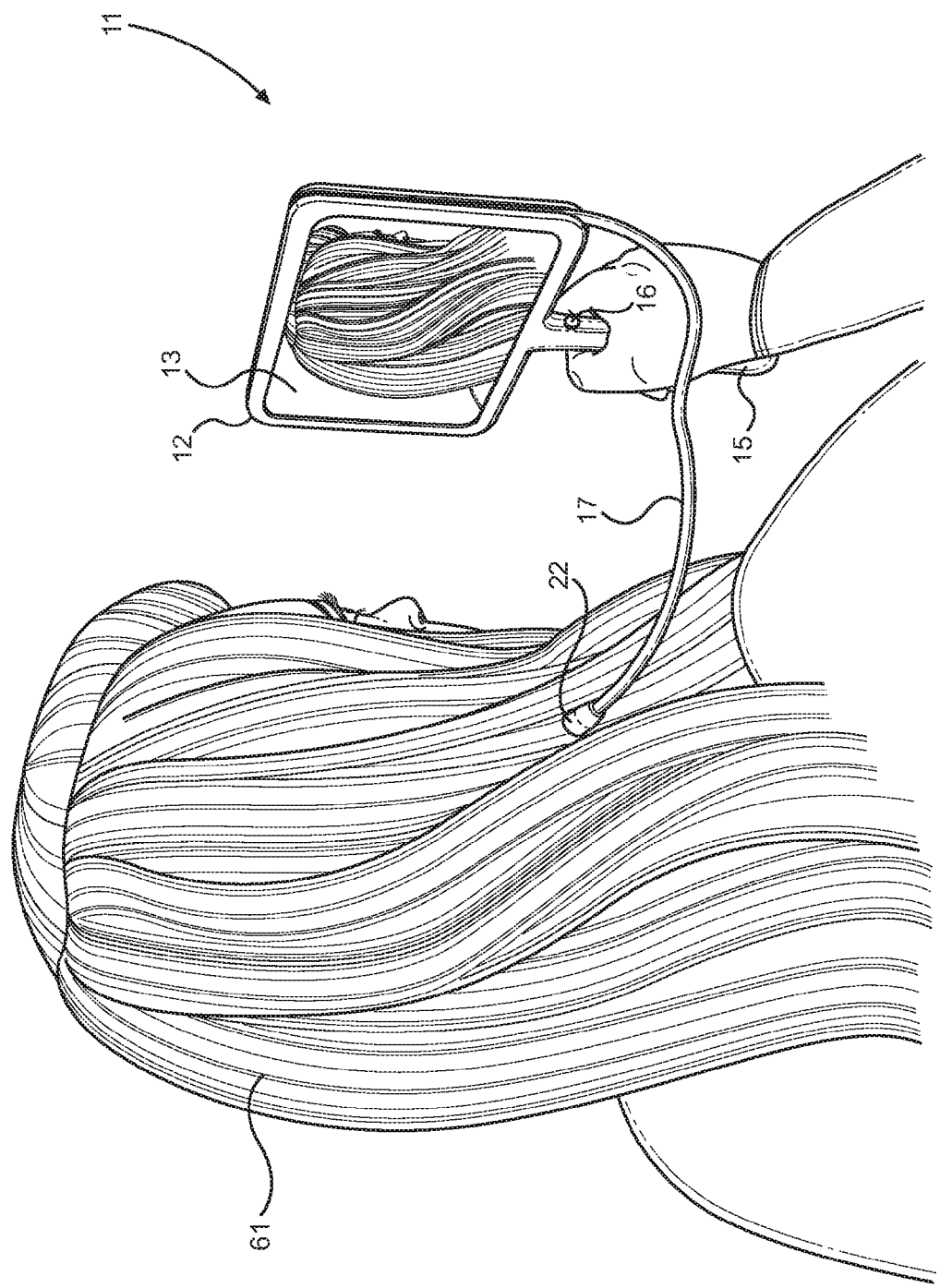
FIG. 4 shows a perspective view of the present invention in use.

Referring now to FIG. 4, there is shown a perspective view of the present invention in use. In operation, a user holds the handle 15 of the device 11 and positions the mirror in front of him or her. Thus, utilizing the mirror side of the housing 12 in a conventional manner. Once the user is satisfied with the appearance of the front of his or her hair, the user can dispose the camera 22 in a desired location, such as directed at the rear of the user's head 61. The camera 22 is turned on via the switch 16 and the user rotates the housing 12 via the handle 15 in order to view the digital display 13. The user continues to manipulate the camera 22 to the desired position without having to constantly twist or use multiple mirrors in order to view the rear of the user's head 61. Once in position, the user may release the camera 22, wherein the flexible cable 17 allows the camera 22 to remain in position. Thus, a user has a free hand to adjust the rear side of his or her hair 61 or the like. In this way, the combination mirror and camera device allows a user to visualize areas that are otherwise difficult to see.

It is therefore submitted that the instant invention has been shown and described in what is considered to be the most practical and preferred embodiments. It is recognized, however, that departures may be made within the scope of the invention and that obvious modifications will occur to a person skilled in the art. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A combination mirror and camera device, comprising:
   a housing including a planar frame;
   a digital display disposed on the planar frame, the digital display including a shape corresponding to a shape of the planar frame;
   a mirror disposed on the planar frame, the mirror including a shape corresponding to a shape of the digital display;
   a camera in communication with the digital display, the camera affixed to a distal end of an elongated cable including a proximal end affixed to a perimeter edge of an upper end of the planar frame;
   the elongated cable composed of a flexible pliant material capable of retaining its shape after being bent and adjusted in a desired position, thereby enabling the camera to be maneuvered into any static position relative to the housing, such that a user may adjust the camera into a desired position such that the camera stays in that position relative to the housing;
   a handle extending outwardly from a perimeter edge of the lower end of the planar frame so as to allow a user to grasp the housing.

2. The combination mirror and camera device of claim 1, wherein the housing is rectangular in shape.

3. The combination mirror and camera device of claim 1, further comprising a switch operably connected to the camera and the digital display and configured to operate the camera and the digital display.

4. The combination mirror and camera device of claim 1, further comprising a power source operably connected to the camera and the digital display in order to provide power thereto.

5. A combination mirror and camera device, comprising:
a housing including a planar frame having a first side opposite a second side and a perimeter edge;
a digital display disposed on the first side, the digital display including a shape corresponding to a shape of the first side;
a mirror disposed on the second side, the mirror including a shape corresponding to a shape of the second side;
wherein the mirror is oriented in a direction opposing a direction of the digital display;
a camera in communication with the digital display, the camera including a flexible cable disposed along a longitudinal length of the perimeter edge;
a recessed channel extending along the longitudinal length of the perimeter edge, the recessed channel configured to removably receive the flexible cable and camera therein;
wherein the camera is removable from the perimeter edge and adjustable relative to the housing via the flexible cable.

6. The combination mirror and camera device of claim 1, wherein the camera is moveable between a stored configuration and a working configuration;
wherein in the stored configuration is the flexible cable is positioned in the recessed channel of the perimeter edge;
wherein in the working configuration the flexible cable is removed from the recessed channel and flexed about the housing, such that it is extending from the perimeter edge of the housing.

7. The combination mirror and camera device of claim 1, wherein the housing is rectangular in shape.

8. The combination mirror and camera device of claim 1, further comprising a handle extending perpendicularly outwardly from a lower end of the housing so as to allow a user to grasp the housing.

9. The combination mirror and camera device of claim 1, further comprising a switch operably connected to the camera and the digital display and configured to operate the camera and the digital display.

10. The combination mirror and camera device of claim 1, further comprising a power source operably connected to the camera and the digital display in order to provide power thereto.

11. The combination mirror and camera device of claim 1, wherein the digital display and the mirror are positioned parallel to each other.

* * * * *